(12) United States Patent
Ghazi-Moghadam (10) Patent No.: US 11,916,668 B2
(45) Date of Patent: Feb. 27, 2024

(54) SOFT DECISION DIFFERENTIAL DEMODULATOR FOR RADIOS IN WIRELESS NETWORKS SUPPORTING TRAIN CONTROL

(71) Applicant: Meteorcomm, LLC, Renton, WA (US)

(72) Inventor: Vafa Ghazi-Moghadam, Seattle, WA (US)

( * ) Notice: Subject to any disclaimer, the term of this patent is extended or adjusted under 35 U.S.C. 154(b) by 0 days.

(21) Appl. No.: 17/546,031

(22) Filed: Dec. 8, 2021

(65) Prior Publication Data
US 2022/0182179 A1 Jun. 9, 2022

Related U.S. Application Data (60) Provisional application No. 63/122,906, filed on Dec. 8, 2020.

(51) Int. Cl.
*H04L 1/00* (2006.01)
*H04L 27/38* (2006.01)

(52) U.S. Cl.
CPC ........ *H04L 1/0055* (2013.01); *H04L 27/3845* (2013.01)

(58) Field of Classification Search
CPC . H04L 1/0055; H04L 27/3845; H04L 1/0054; H04L 25/067
See application file for complete search history.

(56) References Cited

U.S. PATENT DOCUMENTS

| | | |
|---|---|---|
| 568,101 A | 9/1896 | Rouse |
| 4,582,280 A | 4/1986 | Nichols |
| 4,736,371 A | 4/1988 | Tejima |
| 5,039,038 A | 8/1991 | Nichols |
| 5,065,398 A | 11/1991 | Takashima |
| 5,267,473 A | 12/1993 | Bezos |
| 5,377,938 A | 1/1995 | Bezos |
| 5,681,015 A | 10/1997 | Kull |
| 5,720,455 A | 2/1998 | Kull |
| 5,739,768 A | 4/1998 | Lane |

(Continued)

FOREIGN PATENT DOCUMENTS

CN 101345726 A 1/2009

OTHER PUBLICATIONS

Fredric J. Harris et al.; "Digital Receivers and Transmitters Using Polyphase Filter Banks for Wireless Communications"; IEEE Transactions on Microwave Theory and Techniques; vol. 51, No. 4; Apr. 2003; pp. 1395-1412; DOI: 10.1109/TMTT.2003.809176.

(Continued)

*Primary Examiner* — Don N Vo
(74) *Attorney, Agent, or Firm* — Hubbard Law, PLLC (57) ABSTRACT

Improvements to demodulators in receivers of radios used for train communications t to receive a radio frequency (RF) signal transmitting a packet of data. A demodulator is configured to generate a soft decision for a decoder, the soft decision including reliability information determined by calculating for the bit position a logarithmic likelihood ratio (LLR). The demodulator is configured to correct a bias in the LLR calculation for any one of the bit positions resulting from a difference in the number symbols in the set of all possible symbols that could have a 0 value in the bit position and the set of all possible symbols that could have a 1 in the bit position.

8 Claims, 9 Drawing Sheets

(56) References Cited

U.S. PATENT DOCUMENTS

| | | |
|---|---|---|
| 5,757,291 A | 5/1998 | Kull |
| 6,072,993 A | 6/2000 | Trikha |
| 6,115,435 A | 9/2000 | Harada |
| 6,269,116 B1 | 7/2001 | Javerbring |
| 6,322,025 B1 | 11/2001 | Colbert |
| 6,505,104 B2 | 1/2003 | Collins |
| 6,577,610 B1 | 6/2003 | Kronz |
| 6,862,502 B2 | 3/2005 | Peltz |
| 7,042,954 B2 | 5/2006 | Ha |
| 7,467,032 B2 | 12/2008 | Kane |
| 7,535,865 B2 | 5/2009 | Aiken, II |
| 7,742,850 B2 | 6/2010 | Kane |
| 7,808,892 B1 | 10/2010 | Babcock |
| 7,974,246 B1 | 7/2011 | Fulthorp |
| 8,032,078 B1 | 10/2011 | Donich |
| 8,098,645 B2 | 1/2012 | Yee |
| 8,279,796 B1 | 10/2012 | Cleveland |
| 8,340,056 B2 | 12/2012 | Siriwongpairat |
| 8,374,291 B1 | 2/2013 | Himsoon |
| 8,582,694 B2 | 11/2013 | Velazquez |
| 8,602,574 B1 | 12/2013 | Alvi |
| 8,605,754 B2 | 12/2013 | Siriwongpairat |
| 9,037,625 B2 | 5/2015 | Sturza |
| 9,112,735 B1 | 8/2015 | Harris |
| 9,203,558 B1 * | 12/2015 | Dave ................ H04L 23/00 |
| 9,379,576 B2 | 6/2016 | Al Jaeedi |
| 9,398,587 B1 | 7/2016 | Kong |
| 9,450,688 B1 | 9/2016 | Murphy |
| 9,628,030 B1 | 4/2017 | Naidu |
| 9,669,850 B2 | 6/2017 | Fuchs |
| 9,840,260 B2 | 12/2017 | Naidu |
| 10,160,466 B1 | 12/2018 | Potter |
| 10,224,881 B2 | 3/2019 | Naidu |
| 10,469,586 B2 | 11/2019 | Potter |
| 10,710,620 B2 | 7/2020 | Potter |
| 10,858,020 B2 | 12/2020 | Naidu |
| 11,540,279 B2 | 12/2022 | Sarrafan |
| 2002/0003846 A1 * | 1/2002 | Khayrallah ............. H04L 27/38 375/341 |
| 2003/0103589 A1 | 6/2003 | Nohara |
| 2004/0001561 A1 | 1/2004 | Dent |
| 2005/0149339 A1 | 7/2005 | Tanaka |
| 2006/0168500 A1 * | 7/2006 | Whinnett ................ H04L 1/005 714/794 |
| 2007/0170314 A1 | 7/2007 | Kane |
| 2007/0236079 A1 | 10/2007 | Kull |
| 2009/0074101 A1 | 3/2009 | Tang |
| 2010/0020235 A1 | 1/2010 | Bouillet |
| 2010/0130124 A1 | 5/2010 | Teeter |
| 2013/0136075 A1 | 5/2013 | Yu |
| 2014/0301505 A1 * | 10/2014 | Miyazaki ............. H04L 25/067 375/320 |
| 2015/0098514 A1 * | 4/2015 | Tamma ............... H04L 27/2071 375/330 |
| 2017/0088153 A1 | 3/2017 | Fernandes |
| 2018/0019831 A1 | 1/2018 | Zhang |
| 2021/0091898 A1 | 3/2021 | Sarrafan |
| 2022/0006601 A1 | 1/2022 | Zhu |
| 2022/0182179 A1 | 6/2022 | Ghazi-Moghadam |
| 2022/0194443 A1 | 6/2022 | Covari |
| 2022/0201587 A1 | 6/2022 | Edmondson |
| 2023/0138011 A1 | 5/2023 | Naidu |

OTHER PUBLICATIONS

Meteorcomm LLC, "ITCnet Common Air Interface", 2013, 46 pages.

Hewavithana et al., "Soft Decisions for DQPSK Demodulation for the Viterbi Decoding of the Convolutional Codes", ICASSP 2003, 4 pages.

Fatih Genc et al., "On the Optimum Ring Ratio Determination for 16-DAPSK Modulation in OFDM Systems", 2014 IEEE 22nd Signal Processing and Communications Applications Conference (SIU 2014), 4 pages.

* cited by examiner

| Required SNR for PER=5% (Rayleigh fading) | | | |
|---|---|---|---|
| Speed (mph) | Coding | 16APSK | 16DAPSK |
| 20 | no FEC | 30 | 34 |
| | Conv 7/8 | 28 | 32 |
| | Conv 3/4 | 26 | 30 |
| 60 | no FEC | 33 | 37 |
| | Conv 7/8 | 30 | 34 |
| | Conv 3/4 | 28.5 | 31.4 |
| 125 | no FEC | 36 | 42 |
| | Conv 7/8 | 32 | 36 |
| | Conv 3/4 | 28 | 32 |
| Hard decisions, using slicer | | | |

| Required SNR for PER=5% (Rayleigh fading) | | | |
|---|---|---|---|
| Speed (mph) | Coding | 16APSK | 16DAPSK |
| 20 | no FEC | 31.5 | 34 |
| | Conv 7/8 | 26 | 31.2 |
| | Conv 3/4 | 24 | 29.3 |
| 60 | no FEC | 34 | 37 |
| | Conv 7/8 | 28 | 32.8 |
| | Conv 3/4 | 26.5 | 30 |
| 125 | no FEC | 37 | 42 |
| | Conv 7/8 | 30 | 34 |
| | Conv 3/4 | 27 | 31 |
| Soft decisions, with mapping and limiter | | | |

SOFT DECISION DIFFERENTIAL DEMODULATOR FOR RADIOS IN WIRELESS NETWORKS SUPPORTING TRAIN CONTROL

RELATED APPLICATION

This application claims the benefit of U.S. Provisional Application No. 63/122,906 filed Dec. 8, 2020, which is incorporated by reference herein for all purposes.

FIELD OF INVENTION

The disclosure pertains to radios for digital wireless communication systems used by railroads and to radios suitable for use in such systems using soft decision demodulators.

BACKGROUND

Railroads in the United States and Canada have implemented centralized traffic control (CTC) systems that enable a dispatcher at a central office or central dispatch office to monitor and control interlockings and traffic flow within a designated territory. "Interlockings" generally refer to signaling arrangements that prevent conflicting train movements through junctions and crossings. A dispatcher, in some circumstances, can directly control the signal indications giving train movement authorities for a block of track. In addition, a dispatcher may sometimes need to be able to directly control switches that, for example, allow a train to move to a passing siding, crossover to an adjacent track, or turnout to an alternate track or route. A CTC system may also ensure that wayside devices or appliances, such as switches, are properly set before and during train movement through a track block. In addition to receiving status information from signals and switches, the CTC system may also collect status information from other types of wayside devices, such as rail integrity and track circuits and hazard detectors.

A complex collection of interconnected wired and wireless networks is typically relied on by a central office to communicate with wayside devices and trains. The wireless networks are usually spread over large geographic areas. They are comprised of radio base stations linked to each other and to central offices by communication links that are usually wired but are not necessarily limited to wired communications links. The base stations are used to establish and maintain wireless communication links with locomotives, service vehicles, and wayside devices and systems operating within the coverage area for the base station.

Railroads have also been required by law to implement positive train control (PTC) to prevent train-to-train collisions, over-speed derailments, incursions into established work zone limits, and train movement through a switch left in the wrong position. Like a CTC system, messages in a PTC system rely on wireless communication links to transmit messages between the functional subsystems used in controlling movement on railroads: wayside units, which include crossing signals, switches, and interlocks, for example; and mobile units such as locomotives and other equipment that travel on the railways and their onboard controllers; and dispatch units located in central offices. Each functional subsystem consists of a collection of physical components comprising computers or other types of information processing equipment that are programmed to perform control processes, data storage components for storing databases and other information, and communication interfaces through which messages are exchanged.

A PTC system is said to be "interoperable" if it allows locomotives of a host railroad and a tenant railroad to communicate with and respond to the PTC system while supporting uninterrupted movements over property boundaries. Interoperability for PTC systems have been mandated for some railroads under the Rail Safety Improvement Act of 2008 (Public Law 110-432 of 2008).

To support the implementation of positive train control, the Class I freight railroads formed PTC-220 LLC to secure the 220 MHz spectrum as a data radio infrastructure to carry PTC data between base stations and wayside and mobile units.

Designing and operating a communications system for a transportation industry to support interoperability, particularly one as complex as the system of railroads in the United States, requires addressing many constraints. In the railroad industry, for example, a reliable and efficient communications system must be capable of handling different types of information, including data transmitted from the railroad central office and wayside systems to the locomotive on-board computers, as well as voice transmissions between train crews and the central office. Wireless communication systems supporting in interoperable positive train control (IPTC) must also meet the requirements and goals of the Rail Safety Improvement Act of 2008 and transmission band requirements mandated by the Federal Communications Commission (FCC), including, for example, those related to frequency band allocation, channel width, and spacing. Moreover, an IPTC system must also meet all of the engineering demands placed on any system being deployed in the harsh railroad operating environment.

One example of a wireless communication protocol that supports the exchange of messages to provide interoperable train control is ITCnet®, which was developed Meteorcomm, LLC of Renton, Wash. ITCnet® is currently utilized by Class-I railroads, short-line and commuter railroads, system integrators, and Positive Train Control (PTC) hosting providers across the United States to enable interoperable train control communication. It can support, for example, messages for CTC, IPC, IPTC and other systems used by railways in North America. U.S. Pat. Nos. 8,340,056, 8,602, 574, and 10,710,620, which are incorporated herein by reference for all purposes, disclose and describe various aspects of communication processes enabled by ITCnet®. The ITCnet platform currently in use comprises a core messaging system that includes a 220-MHz radio network (ITCR), a messaging system for the Back Office and remote devices (ITCM) and a system management framework (ITCSM).

Figure 1A:
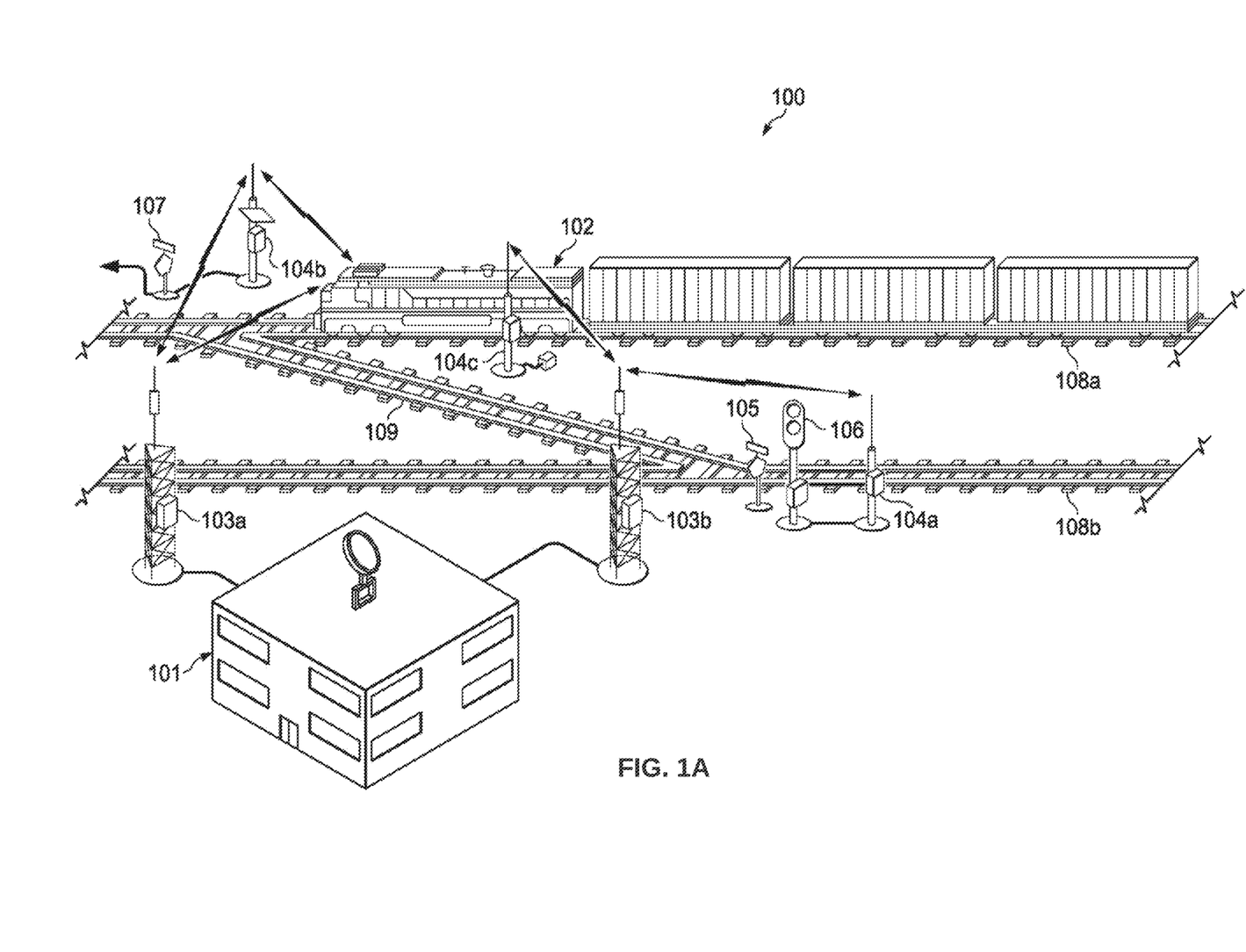
FIG. 1A is a schematic diagram illustrating components of a train control system.

FIG. 1A is a high-level, schematic representation of basic functional subsystems or components of a railroad control system. In this representative example, the railroad control system 100 supports wireless communications between a central office (or network operating center) 101 and locomotives 102 and other railroad vehicles located at various points around a rail system, as well as direct communications between locomotives 102 and the electronic wayside monitoring subsystems. In communications system 100, central office 101 communicates with packet data radios on locomotives 102 through a wired telecommunications network and a series of packet radio base stations dispersed over thousands of square miles of geographical area through which the rail system operates. FIG. 1A illustrates only two representative radio base stations 103a and 103b.

Communications system 100 also includes a series of wayside monitoring subsystems, which monitor wayside systems such as signals, switches, and track circuits and communicate the monitored information directly to locomotives 102 within the corresponding wireless coverage area, as well as to central office 101, though base stations 103. FIG. 1A shows two representative wayside monitoring subsystems 104a and 104b. As examples of typical uses of wayside monitoring subsystems 104, wayside monitoring subsystem 104a is shown monitoring a switch 105 and a signal 106, and wayside monitoring subsystem 104b is shown monitoring a hand-throw switch 107. Also, for illustrative purposes, two parallel sections of track 108a and 108b and a connecting section 109 are shown in FIG. 1A, which represent only a very small part of the overall track system. A "remote radio" refers to a radio that is not at a base station. Remote radios are, for example, the radios disposed on locomotives 102 and other railroad vehicles, the radios at waysides 104, and other radios geographically separated from central office 101 and which are not radios at base stations 103. Mobile remote radios refer to the remote radios disposed on locomotives 102 and other railroad vehicles or any other remote radio that might change location.

Remote radio and base station radios are digital. They transmit, receive, and process information in a binary digital form, meaning as a series of bits. They are typically implemented using a software defined radio (SDR). An SDR implements certain conventional components such as modulators, demodulators, filters, mixers, etc., using software running on a processor or other programmable hardware circuit, examples of which a digital signal processor (DSP), field programmable gate arrays (FPGA), and general purpose processors. In addition to hardware for executing the processes, an SDR will also have additional hardware, such as memory for storage, radio frequency amplifiers, analog to digital (ADC), and digital to analog (DAC) converters, interfaces, and power supplies. An SDR provides several possible advantages, including multi-channel capability and the ability to adapt to different channel conditions. Thus, for example, a remote radio with multi-channel capability on the locomotive 102 enables it to receive information from a base station 103 and a wayside monitoring subsystem 104 simultaneously. Additionally, with an SDR, locomotive 102 and base stations 103 can receive status messages from multiple wayside monitoring subsystems 104 simultaneously. This capability enables support for communications with a high density of waysides in city areas. Descriptions of representative, non-limiting examples of SDR radios are found in U.S. Pat. No. 8,340,056B2 and U.S. Pat. No. 8,279,796B1, each of which is incorporated by reference herein for all purposes.

One challenge with interoperative train control applications, such as IPTC applications, is the need to maintain multiple communications paths between various communications nodes within the system. In addition, these multiple communications paths must support the exchange of different types of information while still meeting all of the wireless regulatory requirements imposed by the FCC. Another set of communication paths is required for maintaining communications with the fixed remote radios at railroad waysides 104. In this case, a communication path is required between the radios at waysides 104 and central office 101 for supporting signal system health and status monitoring, centralized control of control points, and wayside defect detector system data and alarms. A further communication path is required between the mobile radios on locomotives 102 and the radios at waysides 104, which supports wayside status updates provided to locomotives 102 in the proximity of a given set of waysides. In a PTC system, a train generally requires a status update from each approaching wayside. For each wayside 104 within 3.5 miles ahead of a train, the age of the wayside status must not exceed 12 seconds with six 9s (i.e., 99.9999%) reliability. It is also desirable that the wayside status updates are forwarded to central office 101. Another communications path is required between the mobile remote radios on locomotives 102 and non-locomotive railroad vehicles and the mobile remote radios on other locomotives 102 and non-locomotive railroad vehicles. This path supports peer-to-peer proximity position reports so that one mobile radio is aware of the locations of nearby mobile radios.

ITCnet currently supports differential phase shift keying (DPSK) to modulate carrier signals for wireless transmission of data packets in a given frequency channel, specifically differential quadrature phase shift keying (DQPSK), in which carrier signal may have one of four different phases and thus transmit four different symbols. Each symbol thus transmits two bits of information. Each of the four possible symbols that can be transmitted using DQPSK represents a different combination of two-bit values. Using a differential encoding scheme allows the carrier phase of the preceding modulation symbol to be used and thus avoids the need for the receiver to use a carrier reference signal at the receiver for demodulation. A non-coherent receiver can thus be used. Such receivers are simpler. However, non-coherent transmission schemes have higher bit error rates for a given signal to noise ratio as compared to coherent transmission schemes.

The number of bits that can be transmitted per symbol depends on the number of discrete signal states or waveforms that are possible with the modulation scheme. Each waveform is mapped to a symbol. The symbol encodes a grouping or vector of one or more bits that are being sent by a transmitter. These bits must be recovered by a receiver. The number of allowed states is represented by the variable M.

To reduce bit error rates in any modulation scheme, the data or payload that is sent in a data packet is encoded using a convolutional coding algorithm with forward error correction. This allows for correction of errors introduced during transmission by channel noise, fading and other conditions to be corrected at the receiver. The encoding of the data to be sent produces a vector of bit values, $\overline{b_n...b_0}$, where n=0, 1, ... n and is the bit position in the symbol and b is the value of the bit in that position. Each vector is encoded as a symbol for transmission.

However, additional transmission efficiency, meaning more bits per symbol, can be gained by increasing the number of modulated waveforms. In 16DAPSK, for example, each of the possible 16 symbols represents a different combination four-bit values. For 16DAPSK, the symbol to be sent is represents a vector s with four-bit values $s=\overline{b_3 b_2 b_1 b_0}$.

At the receiver, the received, modulated carrier signal must be demodulated by a demodulator. For a differential modulation scheme such as 16DAPSK, a non-coherent, differential demodulator is used. The demodulator samples the transmitted signal at a sampling rate to detect the phase and amplitude of the transmitted signal and, based on this information, the demodulator decides which symbol was transmitted, mapping each sample to a symbol r where $r=\overline{b_3 b_2 b_1 b_0}$ and generating a stream of bits representing each of the bits $b_n$, where n=0 to 3, in the symbols. Demodulators may generate "hard" decisions, in which each bit $b_n$ in the received symbol r has a binary value of 1 or a 0, or a "soft" decision, in which each bit is a quantization that reflects the reliability of the decision.

A Viterbi decoder is used to recover the data from the bit stream from the demodulator. It may use either hard or soft decisions output sequences generated by the demodulator. With a soft decision, the Viterbi decoder uses the reliability of each bit in an input sequence. In contrast, a hard decision uses the logical value of each bit in the input sequence. Because a Viterbi decoder is a maximum likelihood decoder, its performance improves when its input contains information about the likelihood of a bit being 0 or 1. Generally, the performance improvement is about 2 dB when this "soft" information is used by the decoder to make a decision of the transmitted bit.

Figure 1B:
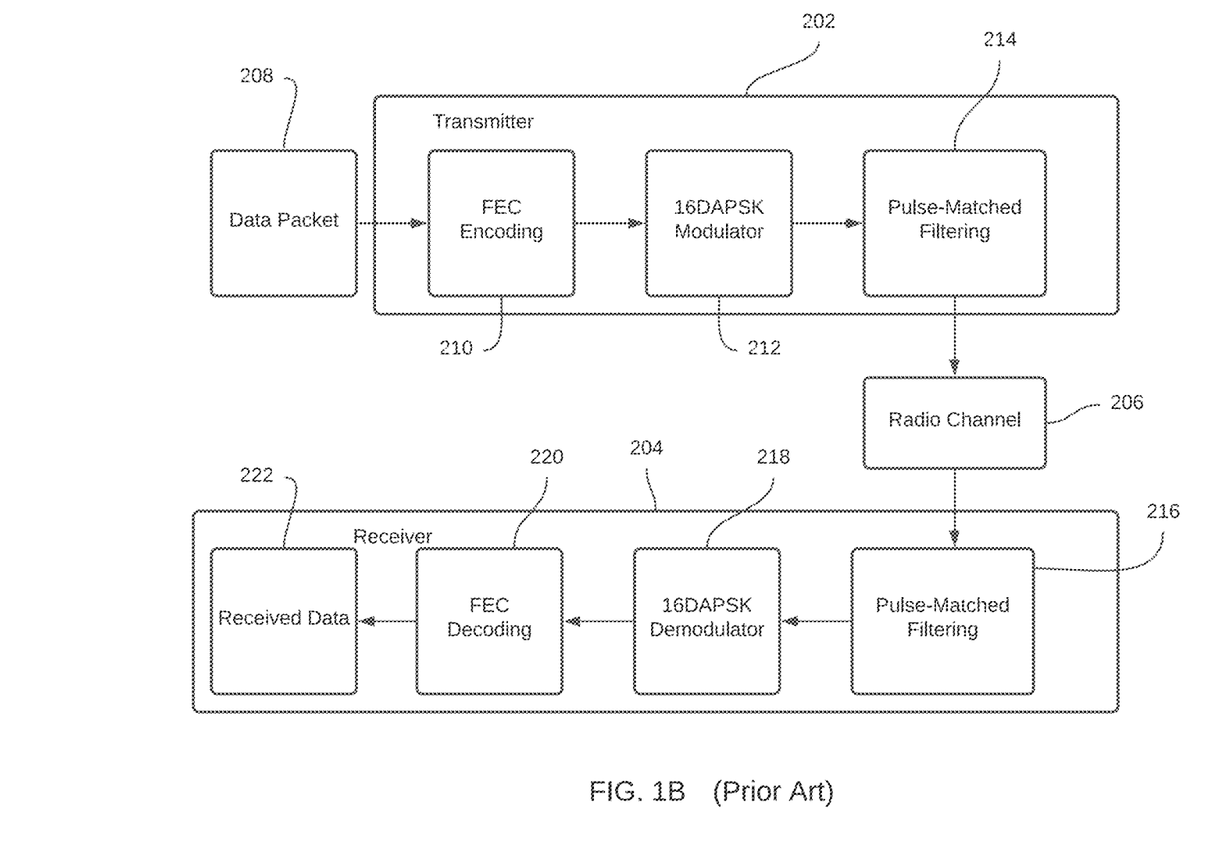
FIG. 1B is a schematic drawing of a representative, non-limiting example of a digital transmitter and receiver.

FIG. 1B is a block diagram of a representative example of a transmitter 202 and a receiver 204 for 16DAPSK modulation of data sent over radio channel 206. A radio will include both a transmitter 202 and a receiver 204 for two-way communication. A data packet 208 containing the bits to be transmitted will typically be encoded but does not have to be encoded using an encoder 210 using convolutional coding with forward error correction. The result is a series of 4-bit code words or symbols used by the 16DAPSK modulator 212 to modulate a carrier signal. The modulated carrier is shaped by pulsed-matched filter 214 before being transmitted wirelessly through the radio channel 206. The received signal is filtered by pulse-matched filter 216 and demodulated by 16DAPSK demodulator 218 to produce an output sequence of bits decoded by decoder 220 to recover the received bits 222.

Figure 2:
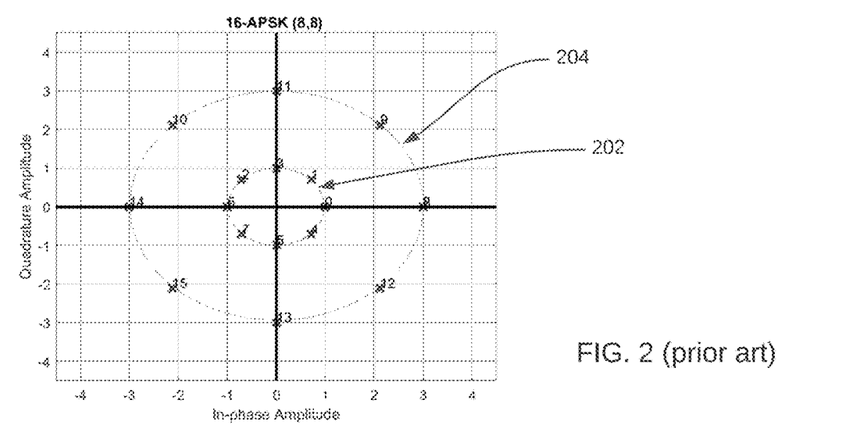
FIG. 2 is a schematic diagram of a 16-APSK transmitter and receiver.

FIG. 2 is a 16-APSK signal constellation diagram that maps each of the possible groupings of 4 bits, each a codeword or symbol, to one of 16 possible waveforms or states of a carrier signal modulated by 16DAPSK. The modulated signal can be represented on the diagram by a vector or phasor with magnitude and phase using polar coordinates and by the amplitude of the in-phase or "I" (x-axis) or and quadrature phase or "Q" (y-axis) components of the carrier wave using cartesian coordinates. Each "X" on the diagram represents the complex state of the signal at a sampling time for each discrete symbol in terms of the amplitude of the modulated I and Q channels of the modulated carrier wave and the magnitude and phase of the carrier signal. For each modulated symbol, the carrier signal may have one of 8 possible phases and one of two different amplitudes at the sampling point as indicated by the 8 symbols, each marked with an X, arrayed along rings 202 and 204. Each ring represents the modulation of the amplitude of the carrier signal (the magnitude of the phasor) between one of the two possible levels. The decimal value adjacent to each "X" is the decimal value of the 4 bits mapped to that particular symbol or signal state.

When a demodulator decides which symbol was transmitted, the decision is based on the sample, the p the receiver receives a transmitted, modulated signal, it is digitized and downconverted by, for example, mixing the received signal and filtering the mixed using, for example, a low pass filter. The proximity of the sample on the signal constellation diagram of FIG. 2 to the predefined symbols "X" can be used to decide which symbol was sent. The signal constellation diagram is subdivided into decision regions—a set of values of amplitude and phase—for each symbol, with the boundary of each decision region equidistant between adjacent symbols in the constellation diagram. If the sample falls within a decision region for one of the symbols, that symbol is the received symbol. The output that is generated if it is a hard decision is a vector with the logical bit values for that symbol.

One method for a demodulator to generate a soft decision for each bit in a received symbol is by calculating for that bit a logarithmic likelihood ratio (LLR) of the probability of that bit being a 0 given the received symbol to the probability of it being a 1 given the same received symbol. This can be expressed mathematically by equation (1).

$$L(b_n) = \log\left(\frac{P(b_n = 0 | r)}{P(b_n = 1 | r)}\right) \qquad \text{Equation (1)}$$

n is the bit position in each symbol s, where n=0, 1, ... M−1, M being the number of possible symbols. For 16DAPSK M is 16 and thus $s=\overline{b_3 b_2 b_1 b_0}$. r is the received symbol.

Using Bayes rule, the probability of a sent bit with a value of 0 being received as 0 and not a 1 is given by equation (2).

$$P(b = 0 | r) = \frac{P(r | b = 0)}{P(r)} P(b = 0) \qquad \text{Equation (2)}$$

Assuming equal probability for all bits, the LLR equation can be written as shown in equation (3).

$$L(b_n) = \log\left(\frac{P(r | b_n = 0)}{P(r | b_n = 1)}\right) \qquad \text{Equation (3)}$$

Assuming that the noise in the channel can be modeled as additive white Gaussian noise, the probability of the received bit being a 0 is given by equation (4).

$$P(r | b_n = 0) = \sum_{s \in S_0} \frac{1}{\sqrt{2\pi}\,\sigma} e^{-\frac{(r-s)^2}{2\sigma^2}} \qquad \text{Equation (4)}$$

s is the symbol that was transmitted. $S_0$ is the set of all symbols for which $b_n=0$. $\sigma^2$ is the noise variance.

The LLR can then be written as shown in equation (5).

$$L(b_n) = \log\left(\frac{\sum_{s \in S_0} e^{-\frac{(r-s)^2}{\sigma^2}}}{\sum_{s \in S_1} e^{-\frac{(r-s)^2}{\sigma^2}}}\right) \qquad \text{Equation (5)}$$

To generate soft decisions, the demodulator must make this calculation for each of the bits in each received symbol. $S_1$ is the set of all possible symbols for which $b_n=1$.

SUMMARY

Because of the higher signal to noise rations required for higher data rates using, for example, 16DAPSK modulation, channel noise and fading present significant impediments to using higher level modulation schemes in wireless networks used by railroads. A wireless network for positive train control must be highly reliable, generally with packet error rates (PER) of 5% or less. Noise can be significant in congested urban corridors. Furthermore, given that trains are capable of speeds of up to 160 mph, channel fading is likely, which causes time variant changes to the phase of the signals.

The following disclosure describes improvements to demodulators in receivers of radios used for train communications that generate soft decisions on data packets transmitted using 16DAPSK modulation that improve performance by lower signal to noise ratios necessary to achieve error rates required for supporting positive train control.

DETAILED DESCRIPTION OF EXEMPLARY EMBODIMENTS

In the following description, like numbers refer to like elements.

Because differential encoding is used, the difference or transition between the amplitude and phase between received between two consecutive symbols represents the symbol that is being sent. Tables 300 and 301 of FIG. 3 list, as a non-limiting example, the amplitude and phase transitions required in a 16DAPSK (8,8) modulation scheme to send one of the symbols along the top rows 302 and 306 after the symbol listed in the left columns 304 and 308 is sent assuming a ring ratio of γ=2. For example, to send symbol 10, which correspond to bits with binary values of "1010" (the left-most digit being the most significant bit (MSB), after sending symbol 6, which has bit values of "0110", the complex transition of the carrier wave to the next symbol state is 2<135. This means that the carrier signal must change in amplitude by a magnitude of 2 and change phase by 135 degrees.

Figure 3:
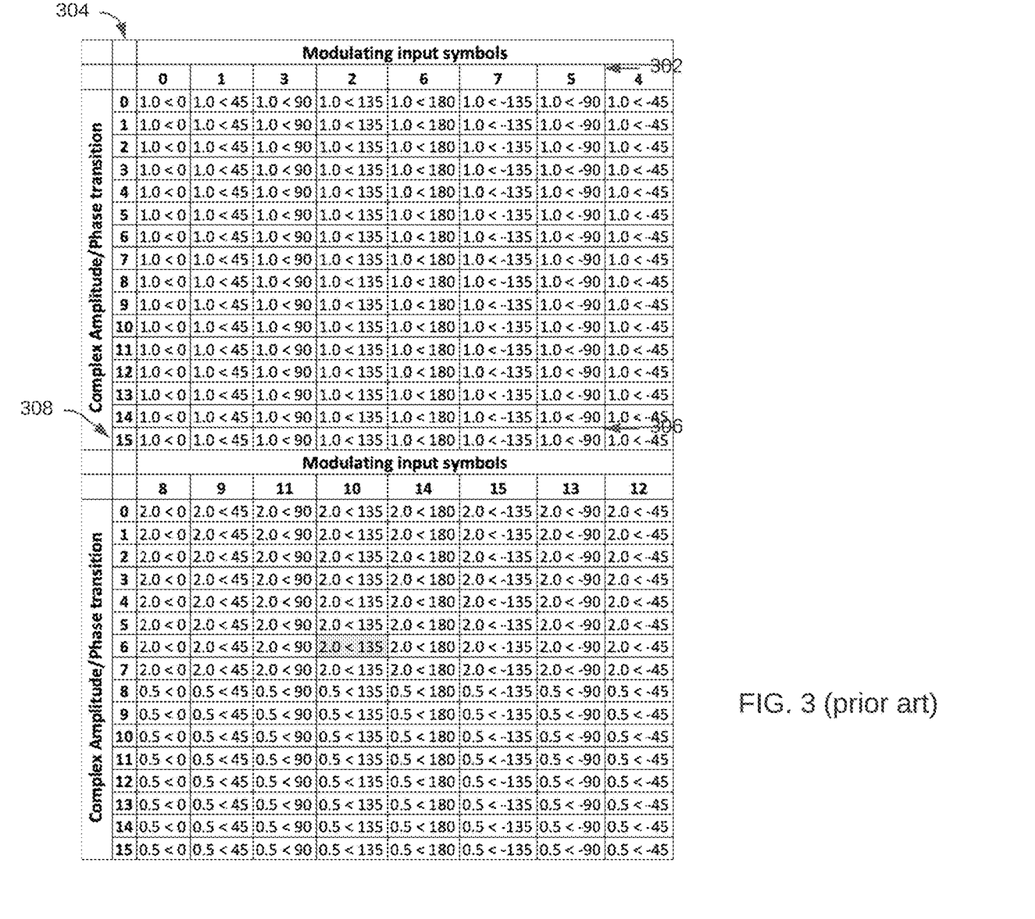
FIG. 3 is a table of transition values of differentially modulating a carrier signal using 16DAPSK.

As it can be seen from the table of FIG. 3, the complex transitions have a magnitude of 1 when the MSB of the modulating symbol is "0" but can have varying magnitudes of either γ or 1/γ when the MSB of the modulating symbol is "1."

Figure 4:
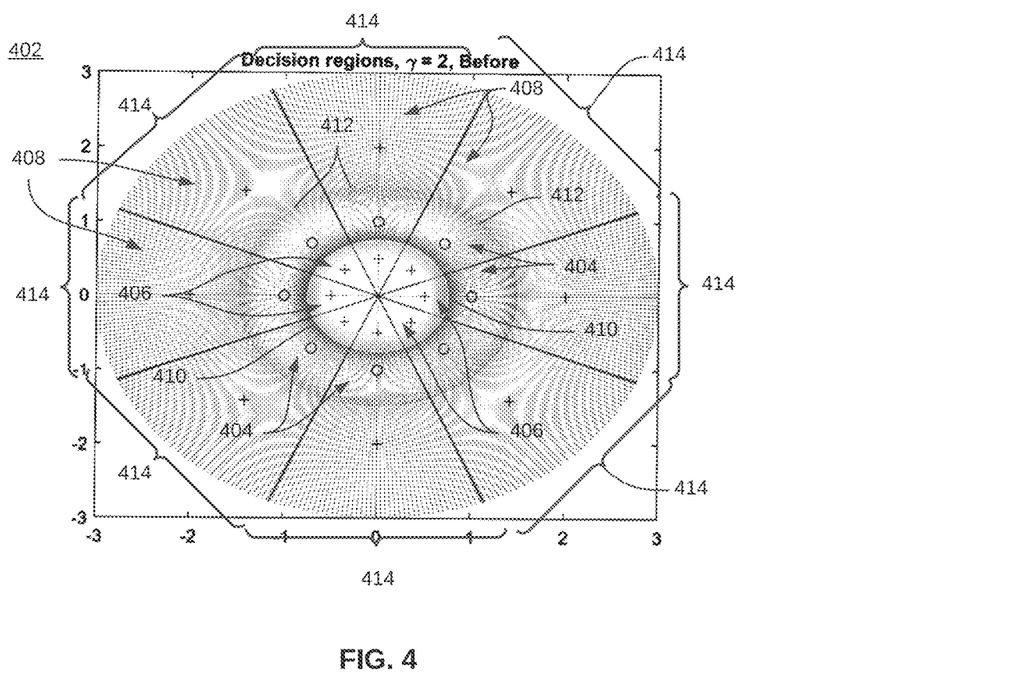
FIG. 4 is a signal constellation diagram for 16DAPSK with decision regions.

Referring to FIG. 4, a signal constellation chart 402 for 16DAPSK with a ring ratio of γ=2 is divided into oct MSB results in split decision regions indicated on constellation chart 402 for 16DAPSK (8,8). Decision region 404 contains 8 complex transitions with unit magnitude. These correspond to transitions in which the MSB of the modulating symbol is "0." Each symbol in this region is marked by a circle. Inner decision region 406 and outer decision region 408 contain a total of 16 possible complex transitions, each with an amplitude γ (region 408) or 1/γ (region 406). Each of the possible symbols in these regions are marked by a plus sign.

A boundary 410 between region 406 and region 404 represents a lower decision threshold for decision region 404, which is given by equation (6).

$$\beta_L = \frac{2}{1+\gamma} \qquad \text{Equation (6)}$$

A boundary 412 between region 404 and region 408 defines an upper threshold value for decision region 404, which is given equation (7).

$$\beta_H = \frac{1+\gamma}{2} \qquad \text{Equation (7)}$$

Having a split region in the decision for symbols sharing the same MSB, such as decision regions 406 and 408 in the illustrated example, creates a bias when calculating a logarithmic likelihood ratio (LLR) for the most significant bit (MSB) for a given received symbol. The reason is that for every complex transition corresponding to a transmitted bit with a logical value of 0 bit, there will be two complex transitions corresponding to a transmitted bit with logical value 1 bit. For bit $b_3$ in the received 16APSK symbol r= $\overline{b_3 b_2 b_1 b_0}$ there are 8 symbols in the set $S_0$ of all possible transitions or symbols with a MSB of 0 and there are 16 possible symbols in the set $S_1$ of symbols for a received symbol with an MSB of 1. Thus, when calculating the LLR using equation (5) for bit b3, there will be a bias in the soft decision toward a b3 of 1. This bias has been confirmed using simulations. For the other bits $b_0$ to $b_2$, there are equal number of possible symbols (12) in $S_0$ and $S_1$. Thus, a split decision region for received symbols may result in a bias when calculating the LLR for a given bit position where the number of possible symbol values is unequal for a bit with a 0 value and a bit with a value of 1.

To correct for this bias, the decision processes of a software implemented of a demodulator, such as demodulator 218 (FIG. 1B), are adapted and configured to implement one of the two methods described below when determining an LLR for the MSB of a received symbol transmitted using 16DAPSK. These methods may be similar situations arising in other modulations schemes, where the set of all possible transitions for each of the two possible values of a bit are not equal when calculating a LLR for a software decision.

The first method will be referred to as the "doubling method." In this method, the number of complex transitions corresponding to an MSB of 0 used in the calculation of LLRs are doubled. Thus, an equal number of complex transitions would be used in the numerator and the denominator of the LLR term in equation (5) for the MSB of a given received symbol. In other words, the number of symbols in sets $S_0$ and $S_1$ would be made the same for each received symbol r when calculating the LLR for the MSB.

The second method will be referred to as the "mapping method." In this method, the part of the inner decision region 406 within each octant 414 corresponding to a transmitted MSB of logical value "1" is mapped onto the outer decision region 408 within that octant corresponding to MSB of logical value "1." This effectively combines the split decision regions 404 and 408, which correspond to the symbols with an MSB value of "1" into one decision region. This makes the calculation of the LLR for soft decisions more straightforward and reduces the number of expressions used in the calculation of LLRs to 16 (8 in the numerator and denominator each) for all the bits in a received symbol. The mapping comprises scaling the inner region by a factor equal to γ followed by a reflection against the line tangent to the outer boundary 412 of the decision region 404 that corresponds to symbols with an MSB equal to 0 for each of the eight octants 414.

Figure 5A:
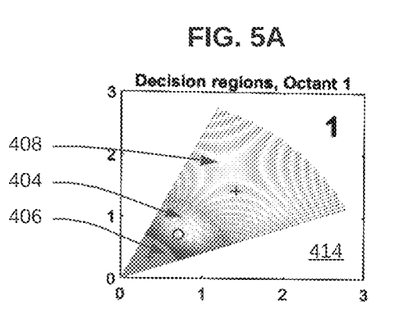
FIG. 5A is an octant of a 16DAPSK signal constellation with decision regions.
Figure 5B:
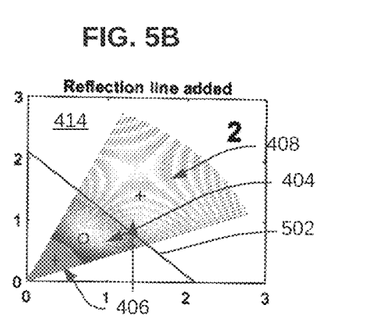
FIG. 5B is an octant of a 16DAPSK signal constellation with decision regions.
Figure 5C:
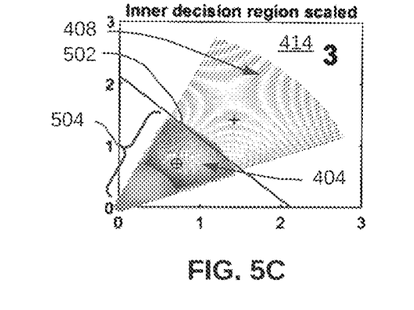
FIG. 5C is an octant of a 16DAPSK signal constellation with decision regions.
Figure 5D:
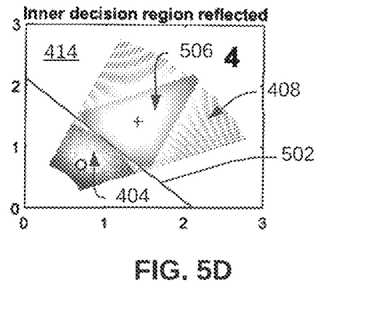
FIG. 5D is an octant of a 16DAPSK signal constellation with decision regions.

FIGS. 5A to 5D demonstrates the mapping operation for one of the 8 octants 414 in the signal constellation of FIG. 4. FIG. 5A shows the decision regions 404, 406 and 408 for octant 1. FIG. 5B shows the same decision regions 404, 406, 408, plus a reflection line 502. FIG. 5C shows scaling of the inner decision region 406, resulting in a scaled decision region 504. In FIG. 5D, the scaled inner decision region 504 has been reflected against the reflection line 502, resulting in decision region 506.

In general, it can be shown that the reflection of a point P with coordinates (p, q) against a given reflection line y=mx+b will be point R with coordinates (u, v), where the values of u and v are given by equations (8) and (9).

$$u = \frac{(1-m^2)p + 2mq - 2mb}{m^2 + 1} \quad \text{Equation (8)}$$

$$v = \frac{(m^2-1)q + 2mp + 2b}{m^2 + 1} \quad \text{Equation (9)}$$

Thus, the parameters for the reflection line 502 can be rewritten as shown in equation (10), α is the angle between the reflection line and the y coordinate.

$$m = -\cot \alpha;\ b = \frac{\gamma+1}{2\sin\alpha} \quad \text{Equation (10)}$$

The new coordinates of a point (p, q) within the inner decision region 406 after scaling by a factor of γ and reflection against the line 502 can then be rewritten as shown in equations (11) and (12).

$$u=\gamma[(1+1/\gamma)\cos\alpha - p\cos 2\alpha - q\sin 2\alpha] \quad \text{Equation (11)}$$

$$v=\gamma[(1+1/\gamma)\sin\alpha + q\cos 2\alpha - p\sin 2\alpha] \quad \text{Equation (12)}$$

In general, $$\alpha = n\frac{\pi}{4},$$

where n=0, . . . , 7 and is the octant number. For octant 1, $$\alpha = \pi/4,\ m = -1 \text{ and } b = \frac{\gamma+1}{\sqrt{2}}.$$

Figure 6A:
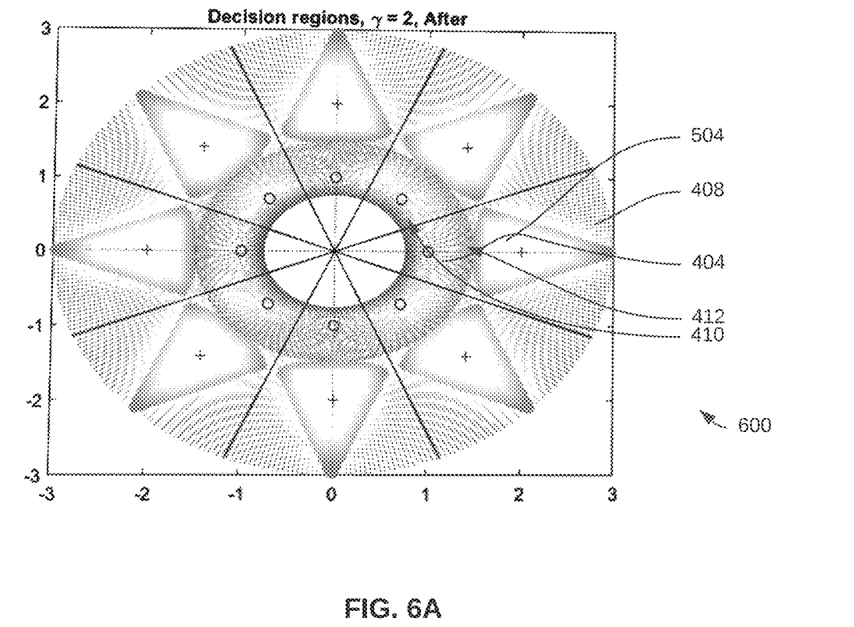
FIG. 6A is a signal constellation diagram for 16DAPSK with altered decision regions for certain symbols with a most significant bit (MSB) value of 1.

Referring now also to FIG. 6A, an entire signal constellation 600 includes the new decision regions after mapping the inner decision region 406 for each octet into a new decision region 504, resulting in a different decision region for each symbol with an MSB of 1 and a magnitude of 1/γ. The decision regions of received symbols with a MSB of 1 now form one contiguous segment.

Figure 6B:
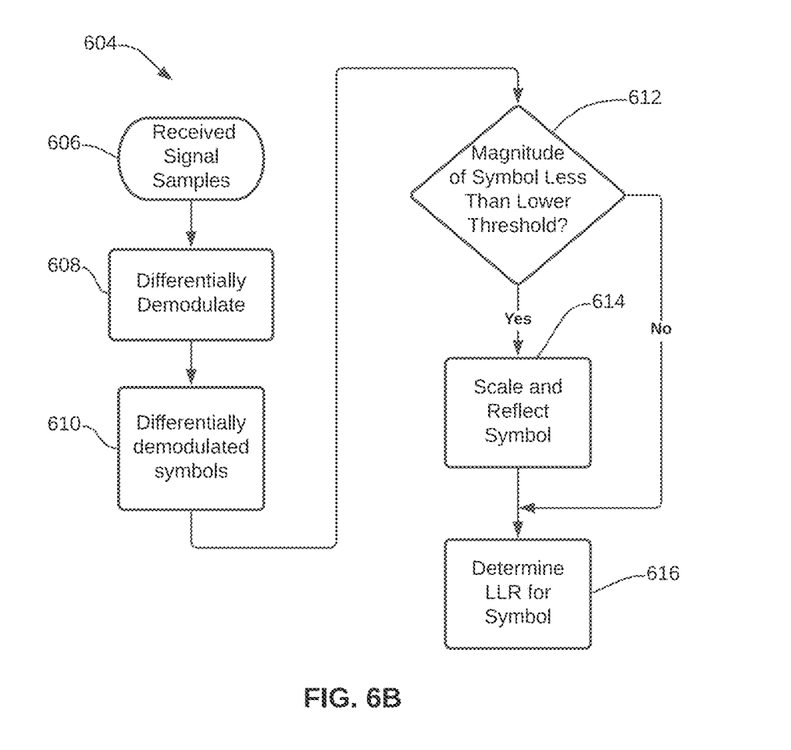
FIG. 6B is a flow diagram for a part of a demodulation method.

The process of, for example, the demodulator 218 is modified to scale and reflect a sample of the received symbol having a magnitude and phase within the inner region 406 according to the transformation equations (11) and (12). This modified process is represented by a flow diagram 604 in FIG. 6B. In an implementation using, for example, MATLAB, the scaling and reflection step for a differentially demodulated symbol occurs when the magnitude of the differentially demodulated symbol falls below a lower threshold defined by equation (6), which is represented by boundary 410 in the figure. Received signal samples 606 are differentially demodulated at step 608 by the differential demodulator 218 to produce differentially demodulated symbols 610. As represented by decision step 612 and process step 614, if a differentially modulated symbol is less than the magnitude of the lower threshold value, it is scaled and reflected according to the transformation equations before the LLR is determined at step 616. If it is not below the lower threshold value, the symbol is not scaled and reflected prior to determination of the LLR. Thus, differentially demodulated symbols with magnitudes below the lower threshold defined in equation (6) are scaled and mapped to the outer decision region 408 for purposes of calculating an LLR that comprises a soft decision. Simulations demonstrate that removing the bias from the calculation results in better performance, a lower requirement for a signal to noise ratio (SNR) to achieve a given packet error rate (PER).

Figure 7:
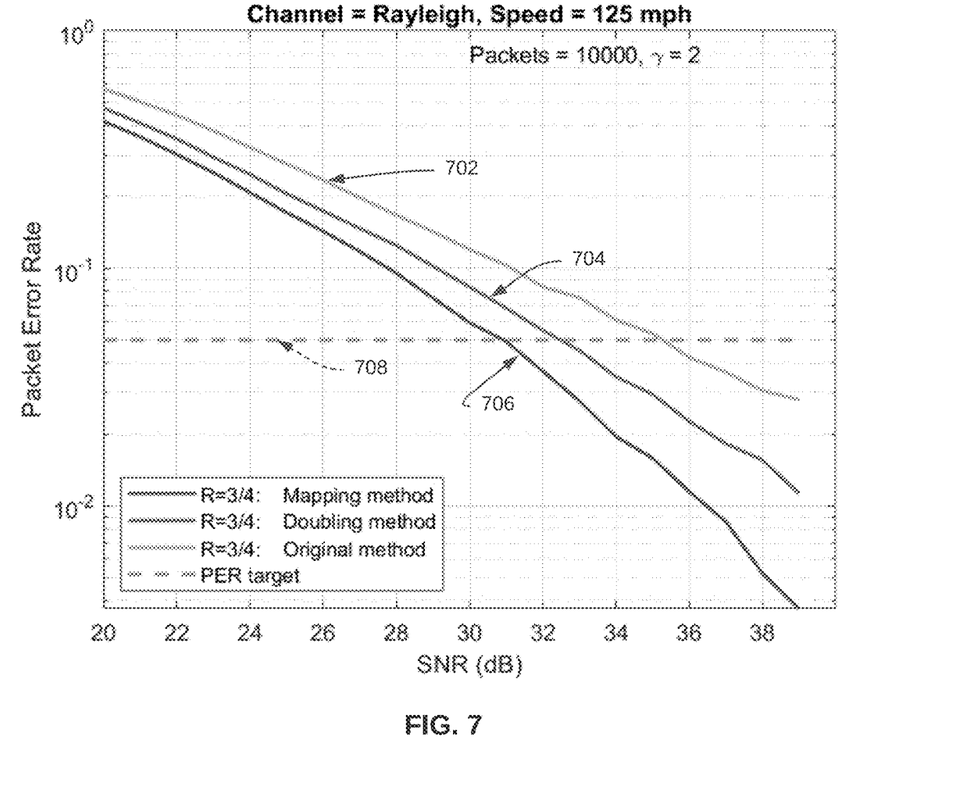
FIG. 7 is a chart showing curves platting signal to noise ratio (SNR) in dB against packet error rates (PER) curves for MATLAB® simulations of each of three different methods of a 16DAPSK demodulator generating soft decisions.

FIG. 7 shows a comparison a simulated performance using a MATLAB simulation that includes models for fading channels, additive white Gaussian noise (AWGN) and forward error correction (FEC) in terms of PER versus SNR for a 16DAPSK soft-decision modulator as described above without the use of either the doubling method or the mapping method, which is labelled as "original method," which is line 702, as compared to the performance of the 16DAPSK soft-decision modulator modified to use the doubling method, line 704, and the mapping method, line 706. The improvements of using the doubling method with the 16DAPSK soft-decision modulator and not using is improvement of 2 dB in terms of SNR required to achieve a 5% PER, which is indicated by dashed line 708. Using the mapping method improved performance by 4 dB. Furthermore, the simulation mapping method is the fastest. Computationally, the mapping method is also the fastest of all 3, requiring 570 seconds to process 10000 packets compared to 580 seconds for the original method and 590 seconds for the doubling method.

Figure 8:
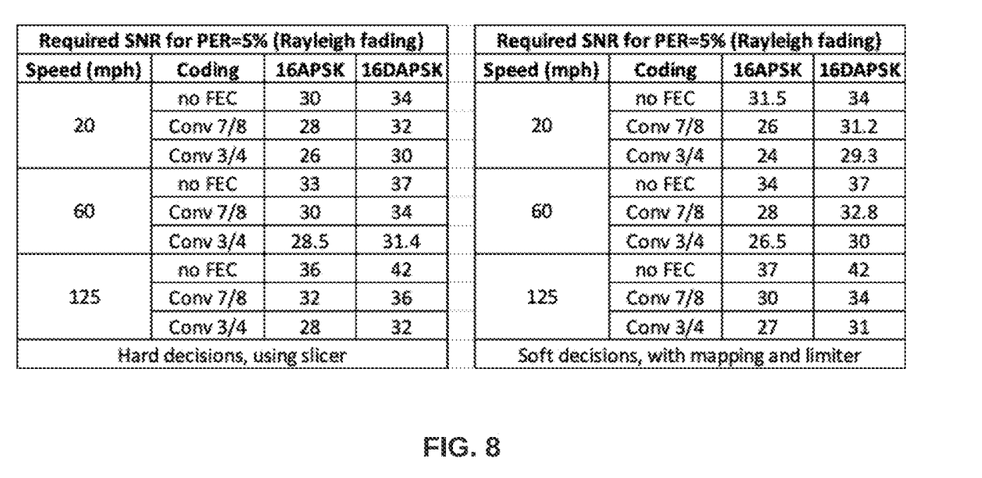
FIG. 8 is a table listing the required SNR to achieve 5% PER with Rayleigh Fading at 3 different speeds using 16APSK and 16DAPSK modulation with different coding for each modulation scheme.
Figure 9A:
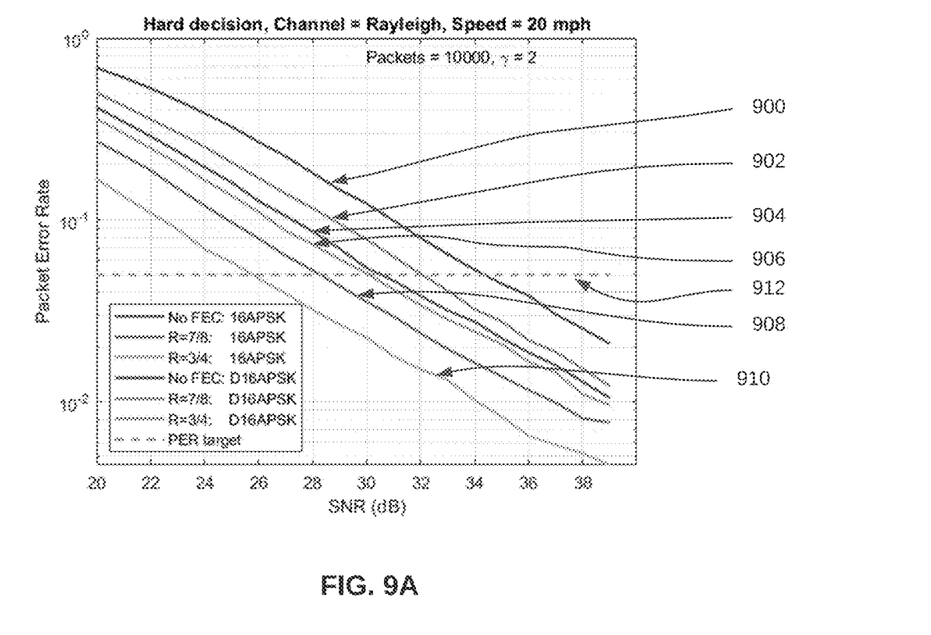
FIGS. 9A-9B, 10A-10B, and 11A-11B show PER versus SNR curves for decoding with both hard- and soft-decision from 16DAPSK demodulator for different coding rates and under fading conditions with different vehicle speeds.
Figure 9B:
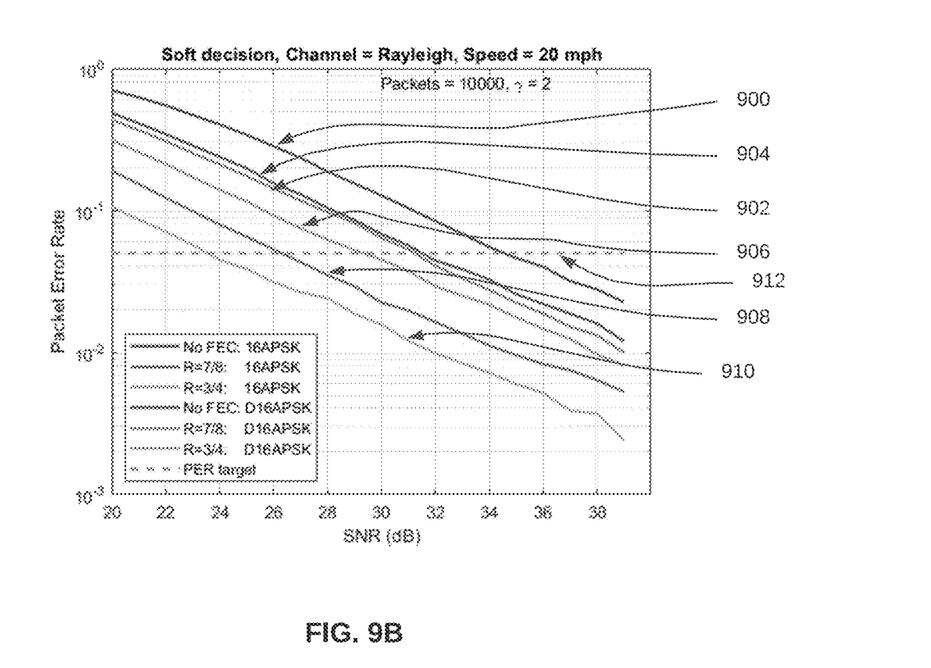
Figure 10A:
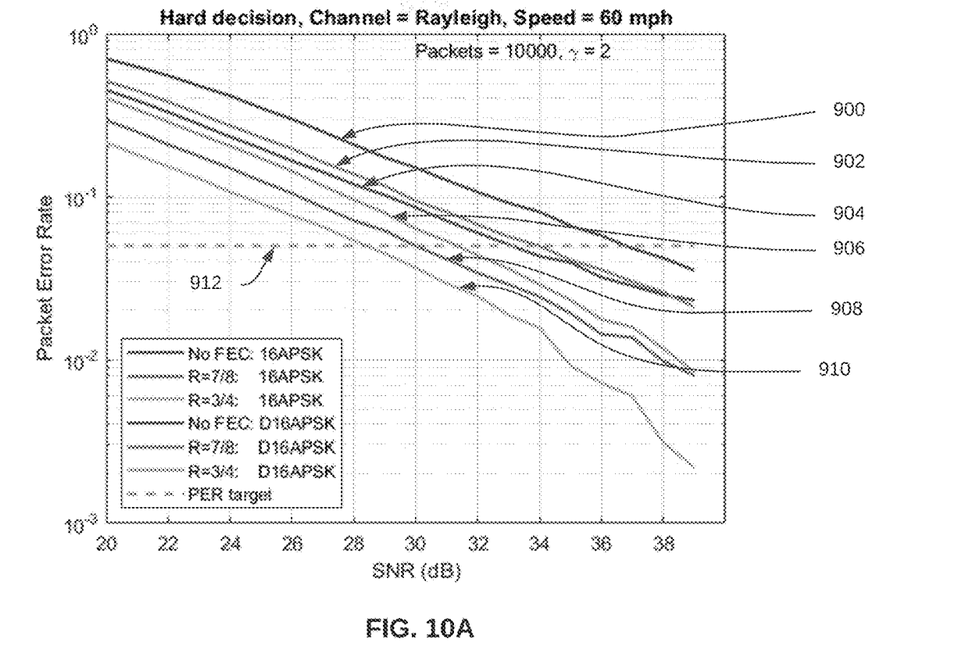
Figure 10B:
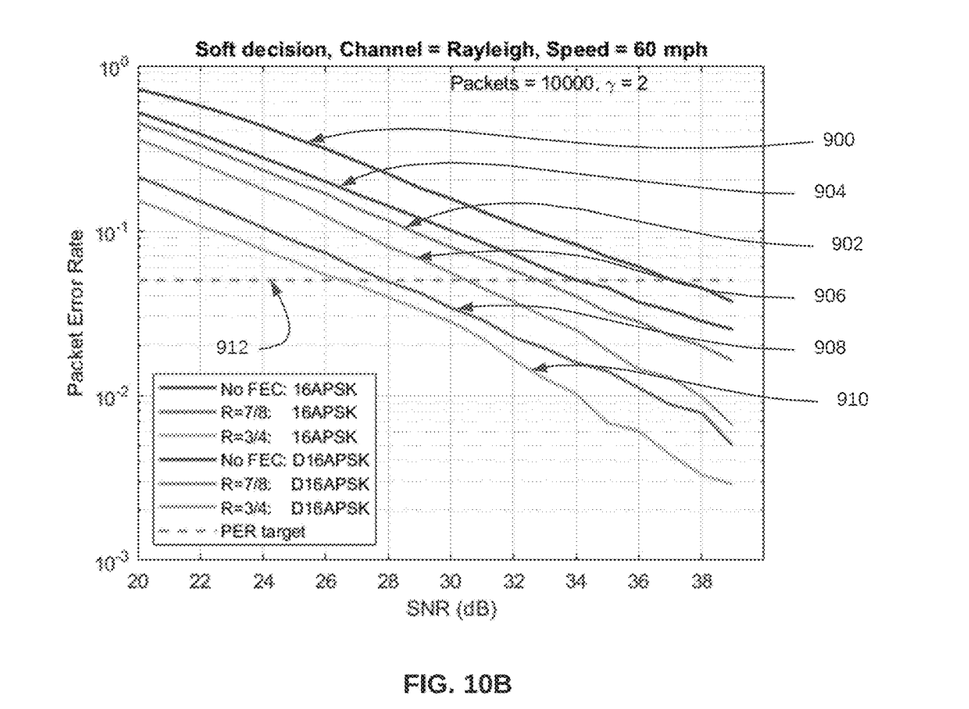

The table of FIG. 8 lists the required SNR to achieve 5% PER with Rayleigh Fading at 3 different speeds using 16APSK and 16DAPSK modulation with no FEC coding, convolutional coding at ⅞ rate, and convolutional coding at a ¾ rate for each modulation scheme. Depending on the example, the simulations demonstrate about 0.7 to 2 dB gain by using soft-decisions over hard-decisions for a decoder in a receiver.

Figure 11A:
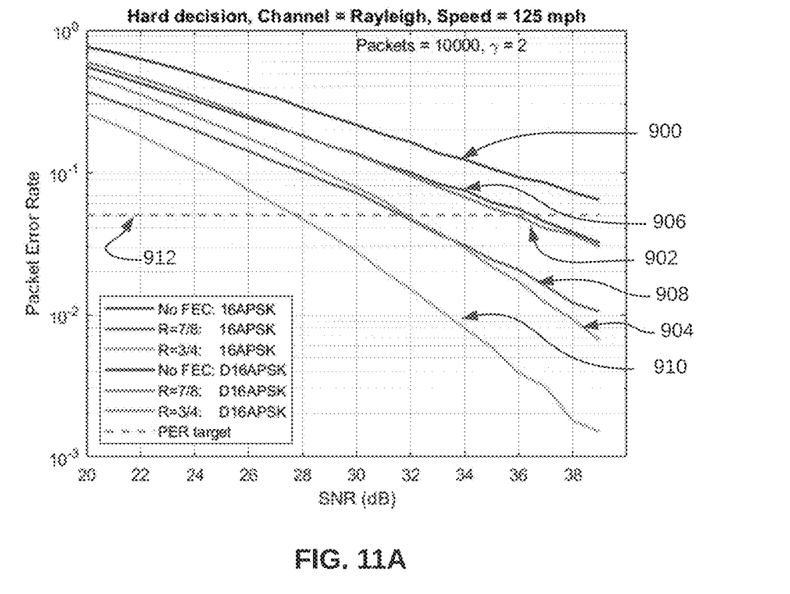
Figure 11B:
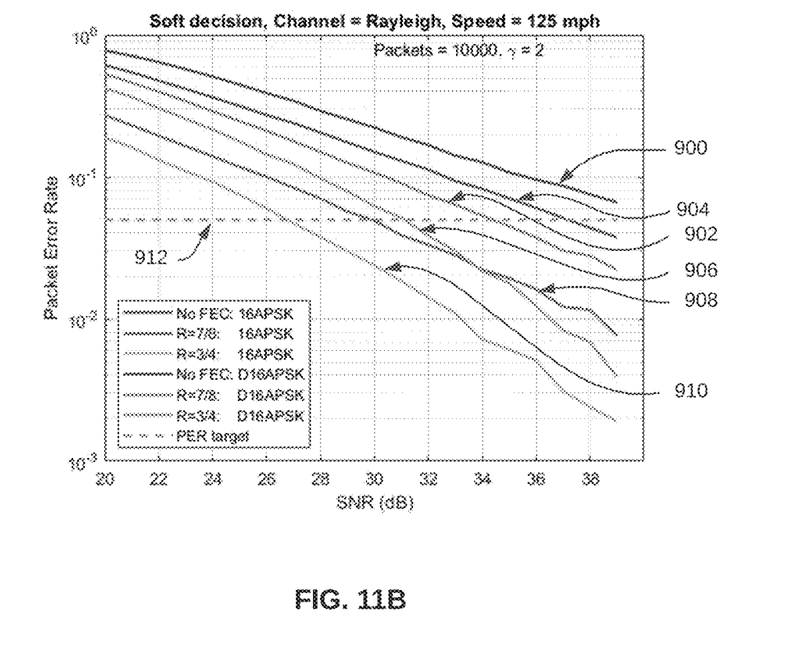

FIGS. 9A-9B, 10A-10B, and 11A-11B show the PER vs SNR curves from simulations that decode using hard-decisions (FIGS. 9A, 10A, and 11A) and soft-decisions (FIGS. 9B, 10B, and 11B) from 16DAPSK and 16APSK demodulators with the coding indicated in the table of FIG. 8 and speeds of 20 miles per hour (MPH) (FIGS. 9A-9B), 60 MPH (FIGS. 10A-10B), and 120 MPH (FIGS. 11A-11B). The PER target of 5% is also marked in these figures. The curves correspond to the demodulation and coding as set out in Table 1.

TABLE 1

| Curve 900 | D16APSK with no forward error correction (FEC) |
| --- | --- |
| Curve 902 | 16APSK with no FEC |
| Curve 904 | D16APSK with R = 7/8 |
| Curve 906 | D16APSK at R = 3/4 |
| Curve 908 | 16APSK with R = 7/8 |
| Curve 910 | 16APSK with R = 3/4 |

Dashed line 912 represents the target PER.

The foregoing description is of exemplary and preferred embodiments. The invention, as defined by the appended claims, is not limited to the described embodiments. Alterations and modifications to the disclosed embodiments may be made without departing from the invention. The meanings of the terms used in this specification are, unless expressly stated otherwise, intended to have ordinary and customary meaning and are not intended to be limited to the details of the illustrated or described structures or embodiments.

What is claimed is:

1. A radio for communicating over a wireless network supporting train control, the radio comprising a receiver configured to receive a radio frequency (RF) signal transmitting a packet of data comprising a sequence of bits using a modulation scheme providing for at least 16 possible discrete symbols, each symbol comprising a group of at least 4 bits, each of the at least 4 bits occupying a predefined bit position in the symbol; the receiver comprising:
a demodulator configured to demodulate the RF signal according to the modulation scheme and generate for each received symbol a soft decision of which of the at least 16 possible discrete symbols was received; and
a decoder configured to decode the soft decisions to recover the data in the packet;
wherein the demodulator is configured to generate a soft decision by generating for received symbol a bit value and reliability information reflecting a probability of the bit value being correct, the reliability information determined by calculating for the bit position a logarithmic likelihood ratio (LLR) of the probability of the bit value being 0 given the received symbol to the probability of the bit value being a 1 value in the bit position; and
wherein the demodulator is further configured to correct a bias in the LLR calculation for any one of the bit positions resulting from a difference in the number symbols in a first set of all possible symbols that could have a value of 0 in the bit position and a second set of all possible symbols that could have a value of 1 in the bit position.

2. The radio of claim 1, wherein demodulator is configured to correct the bias in the LLR calculation by mapping a first set of decision regions in a signal constellation for the modulation scheme into a second set of decision regions in the signal constellation according to a predetermined transformation; the first set of decision regions and the second set of decision regions containing a set of all possible symbols that contain the same bit value in the same position.

3. The radio of claim 2, wherein the demodulator is further configured to map a received symbol according to the predetermined transformation and calculating the LLR for each bit position according to the mapping.

4. The radio of claim 1, wherein the demodulator is configured to correct the bias in the LLR calculation by making the number symbols in the set of all possible symbols that could have a 0 value in the bit position equal to the set of all possible symbols that could have a 1 in the bit position by increasing the number of possible symbols in whichever of the first and second set of all possible symbols has a lower number of symbols before calculating the LLR for the bit position.

5. A method for communicating over a wireless network supporting train control, the method comprising:
receiving a radio frequency (RF) signal transmitting a packet of data comprising a sequence of bits using a modulation scheme that provides for at least 16 possible discrete symbols, each symbol comprising a group of at least 4 bits, each of the at least 4 bits occupying a predefined bit position in the symbol;
demodulating the RF signal according to the modulation scheme and generating for each received symbol a soft decision of which of the at least 16 possible discrete symbols was received; and
decoding the soft decisions to recover the data in the packet;
wherein demodulating comprises,
generating for received symbol a bit value and reliability information reflecting a probability of the bit value being correct, the reliability information determined by calculating for the bit position a logarithmic likelihood ratio (LLR) of the probability of the bit value being 0 given the received symbol to the probability of the bit value being a 1 value given the received symbol, the LLR being calculated on a basis of all possible symbols that could have a 0 value in the bit position and all possible symbols that could have a 1 in the bit position; and
correcting a bias in the LLR calculation for any one of the bit positions resulting from a difference in the number symbols in a first set of all possible symbols that could have a value of 0 in the bit position and a second set of all possible symbols that could have a value of 1 in the bit position.

6. The method of claim 5, wherein demodulating further comprises correcting the bias in the LLR calculation by mapping a first set of decision regions in a signal constellation for the modulation scheme into a second set of decision regions in the signal constellation according to a predetermined transformation; the first set of decision regions and the second set of decision regions containing a set of all possible symbols that contain the same bit value in the same position.

7. The method of claim 6, wherein demodulating further comprises mapping a received symbol according to the predetermined transformation and calculating the LLR for each bit position according to the mapping.

8. The method of claim 5, wherein demodulating further comprises correcting the bias in the LLR calculation by making the number symbols in the set of all possible symbols that could have a 0 value in the bit position equal to the set of all possible symbols that could have a 1 in the bit position by increasing the number of possible symbols in whichever of first or second set of all possible symbols has a lower number of symbols before calculating the LLR for the bit position.

\* \* \* \* \*